Figure 1:
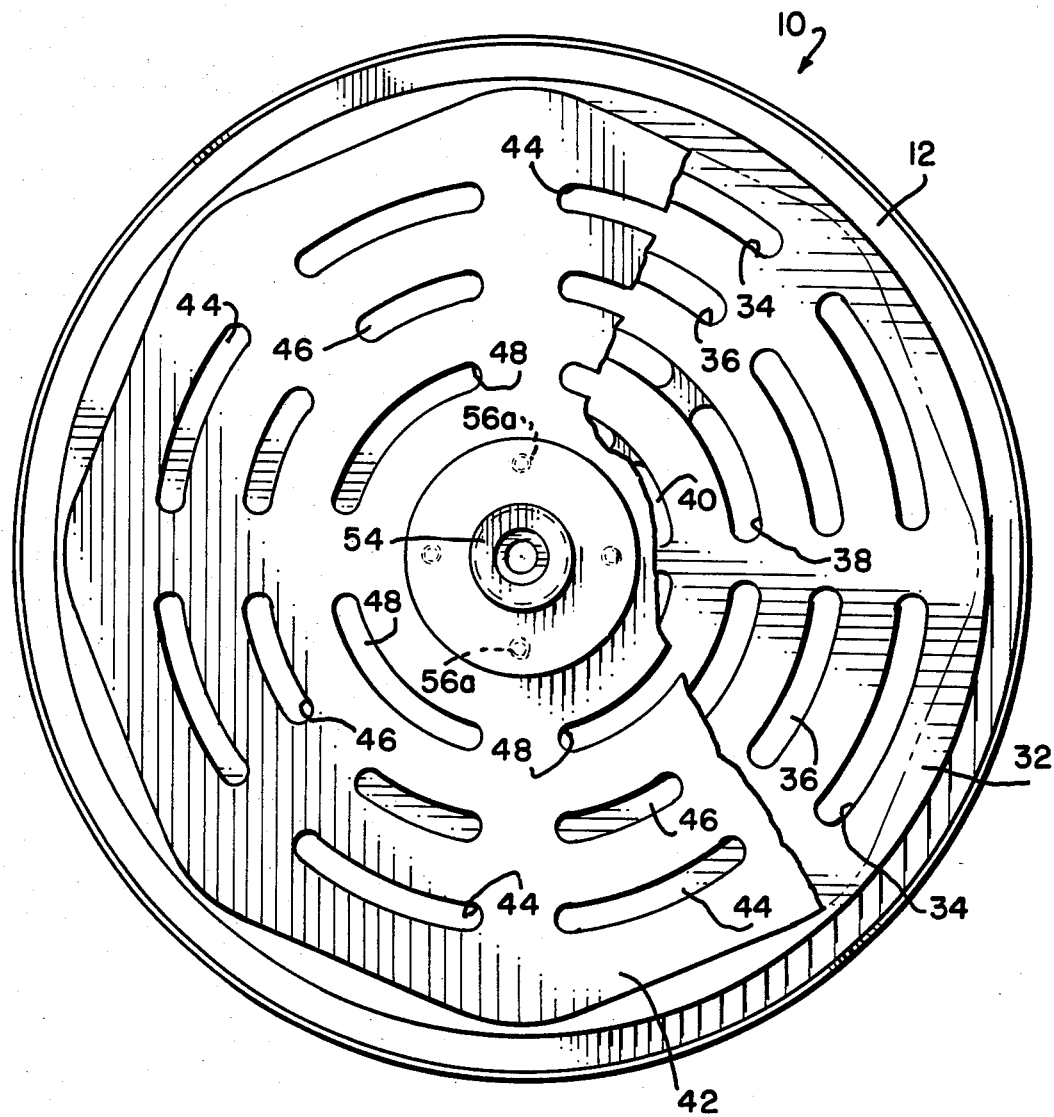

United States Patent

Hartshorn

[11] Patent Number: 4,627,464
[45] Date of Patent: Dec. 9, 1986

[54] UNIDIRECTIONAL, FLUID CONTROL VALVE

[75] Inventor: Kevin Hartshorn, Plainsboro, N.J.

[73] Assignee: Ingersoll-Rand Company, Woodcliff Lake, N.J.

[21] Appl. No.: 811,446

[22] Filed: Dec. 20, 1985

[51] Int. Cl.⁴ ............................................. F16K 15/08
[52] U.S. Cl. .................. 137/516.13; 137/514; 137/516.21
[58] Field of Search .......... 137/512.1, 516.11–516.23, 137/514

[56] References Cited

U.S. PATENT DOCUMENTS 3,369,563  2/1968  Deminger ........................... 137/514
3,703,912  11/1972  Bauer ................................. 137/514
4,526,195  7/1985  Humphrey ................. 137/516.13 X
4,570,666  2/1986  Hartshorn ........................ 137/512.1

Primary Examiner—Robert G. Nilson
Attorney, Agent, or Firm—B. J. Murphy

[57] ABSTRACT

The valve employs a buffered valve seat; a buffer plate is interposed between the seat and the valving element. Consequently, the valving element can manifest an increased lift, whereby the valve will offer an improved performance, as the buffer plate dampens the impact of the valving element during valve closure. Springs accelerate the return of the valving element toward the seat and, as the buffer plate has no spring-assisted seating, it intercepts the valving element in its closure. A guide ring shoulder restricts the lift of the buffer plate.

8 Claims, 3 Drawing Figures

UNIDIRECTIONAL, FLUID CONTROL VALVE

Unidirectional, fluid control valves, such as those commonly used in reciprocating gas compressors, come in a variety of shapes and sizes. In general, they may be characterized as having a displaceable valving element of plate, ring, channel or other geometric shape which seals against a seat under pressure. The valving elements are generally spring-assisted such that the opening- and closing-points as well as the relative dynamics of the valve are controlled.

The valve designer is often faced with a number of trade-offs in the selection of valve characteristics. He or she would like to have a valve design which is efficient (a low pressure drop) and, at the same time, a design which demonstrates good life characteristics. The irony of the design synthesis is that it is difficult to make gains in one area without sacrificing acceptable standards in the other.

At times, a good performing valve will not give acceptable life. The design steps generally taken are directed toward reducing the valve element impact velocity at the stop or at the seat. To this end, usually two things are specified either separately or together:

1. Make a change in the spring selection.
2. Reduce the valve lift.

The valve life problem can be improved, as a consequence of reducing the valve lift but the performance of the valve, therefore, shall have been reduced. Consequently, the user is paying a performance penalty for increased valve life.

Valve designers have long recognized the valve opening process as a problem in a variety of designs and applications. Various pneumatic and mechanical buffer systems have been devised, and are well represented in the prior art, which dampen the impact of the valving element during valve opening.

Experiments with a plate-style valve have shown stress levels, generated due to impact of the valving element with the seat, which are large enough to explain valve failures which have been observed. It is an object of this invention to increase the life of a conventional-lift valve, or to accommodate a lift increase without a severe reduction in valve life. That is, the conventional lift can be increased to achieve better performance (less pressure drop) without paying a penalty in valve durability.

Pursuant to the foregoing, then, it is an object of this invention to set forth a unidirectional, fluid control valve, comprising first means defining a valve seat having a seating surface and fluid ports formed therein; second means, coupled to said valve seat, defining a ported, valving element step having a planar, stop surface; and third means, movably disposed between said seat and said stop, (a) for engaging said seat and occluding said ports in said seat, and (b) for lift thereof from said seat to expose said ports in said seat, thereby to prohibit, and to permit, fluid flow through said ports in said seat, respectively; wherein said third means comprises an apertured valving element and an apertured buffer element; said buffer element is interposed between said valving element and said seat; and apertures in said buffer element are occluded by said valving element; and further including means interposed between said seating surface and said stop surface for restricting lift of said buffer element.

It is also an object of this invention to set forth a unidirectional, fluid control valve, comprising first means defining a valve seat having a seating surface and fluid ports formed therein; second means, coupled to said valve seat, defining a ported, valving element stop having a planar, stop surface; and third means, movably disposed between said seat and said stop, (a) for engaging said seat and occluding said ports in said seat, and (b) for lift thereof from said seat to expose said ports in said seat, thereby to prohibit, and to permit, fluid flow through said ports in said seat, respectively; wherein said third means comprises an apertured valving element, and an apertured buffer element; said buffer element is interposed between said valving element and said seat; and apertures in said buffer element are in open fluid communication with said ports in said seat; and further including means interposed between said seating surface and said stop surface for restricting lift of said buffer element.

It is another object of this invention to disclose a unidirectional, fluid control valve, comprising first means defining a valve seat having a seating surface and fluid ports formed therein; second means, coupled to said valve seat, defining a ported, valving element stop having a planar, stop surface; and third means, movably disposed between said seat and said stop, (a) for engaging said seat and occluding said ports in said seat, and (b) for lift thereof from said seat to expose said ports in said seat, thereby to prohibit and to permit fluid flow through said ports in said seat respectively; wherein said third means comprises an apertured valving element and an apertured buffer element; said buffer element is interposed between said valving element and said seat; and apertures in said buffer element and ports in said stop are out of alignment; and further including means interposed between said seating surface and said stop surface for restricting lift of said buffer element.

It is yet a further object of this invention to set forth a unidirectional, fluid control valve, comprising first means defining a valve seat having a seating surface and fluid ports formed therein; second means, coupled to said valve seat, defining a ported, valving element stop having a planar, stop surface; an apertured valving element interposed between said seat and said stop for movement thereof through a given distance, (a) in a first direction toward said stop, and (b) in a second direction toward said seat; and third means movably disposed between said element and said seat for (a) lift thereof from said seat, and (b) interception of said valving element, intermediate said given distance, during movement of said element in said second direction.

Figure 2:
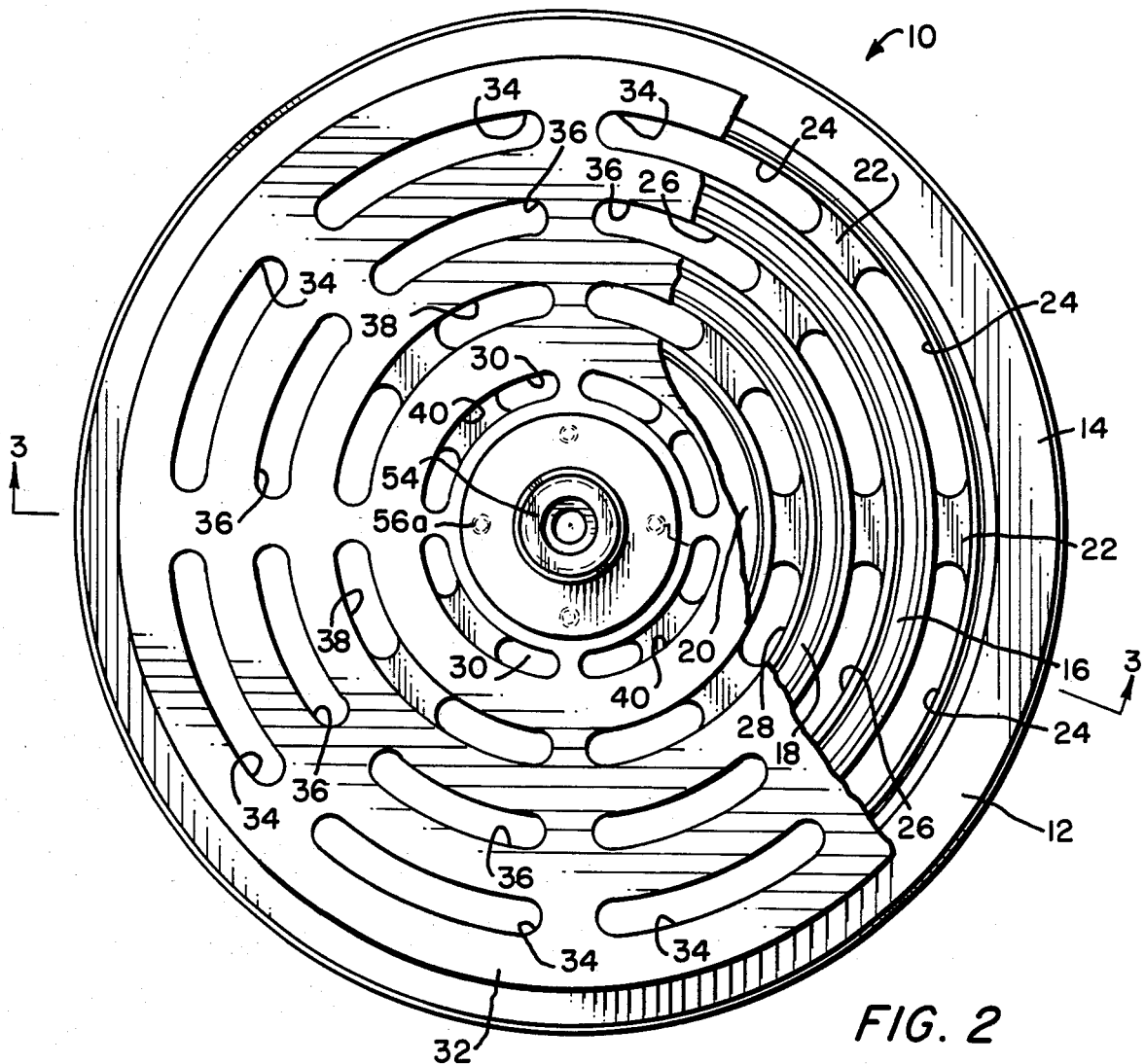
Figure 3:
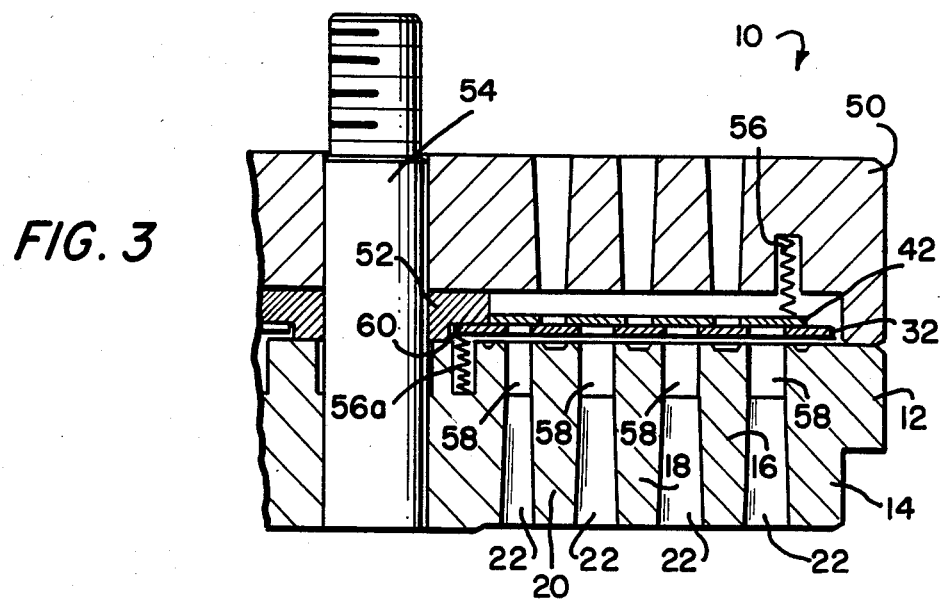

Further objects of this invention, as well as the novel features thereof, will become more apparent by reference to the following description taken in conjunction with the accompanying figures, in which:

FIG. 1 is a plan view of a fluid control valve in which, however, the stop plate has been omitted, according to the best mode or embodiment of the invention known to the inventor for carrying out the invention, the same having a portion of the plate-type valving element cut away in order to show the apertured buffer plate thereunder;

FIG. 2 is a plan view, like that of FIG. 1, in which the valving element is omitted and a portion of the buffer plate is cut away to show the ports in the valve seat thereunder, as well as the concentric annuli and radial arms of the seat; and FIG. 3 is a partial, cross-sectional view of the novel valve, according to an embodiment thereof, corresponding to FIGS. 1 and 2, but including as well the stop and compression springs.

As shown in the figures, novel valve 10 comprises a valve seat 12 formed of a plurality of concentric annuli 14, 16, 18 and 20 which are separated by radial arms 22. As shown in the figures, the arms 22 extend radially between the ports 24, 26, 28 and 30 formed in the seat 12. An apertured buffer plate 32 is shown lying directly upon seat 12 (in FIG. 2), and it will be noted that the ports 34, 36, 38 and 40 in the buffer plate 32 open onto the valve seat ports 24, 26, 28 and 30. Ports 38 and 40 of the buffer plate 32 each open directly onto a pair of seat ports, i.e., pairs of ports 28 and pairs of ports 30, respectively. Ports 34 and 36 of the buffer plate 32 each open directly onto and are in direct alignment with, ports 24 and 26, respectively, of the seat 12.

In FIG. 1, the buffer plate 32 is shown again, but now with a ported valve plate 42 with a portion of the latter cut away, thereupon. The valve plate 42 is of scalloped configuration according to my earlier patent, U.S. Pat. No. 4,532,959, which issued on Aug. 6, 1985 for "A Valving Element for a Plate Type Valve". As depicted in FIG. 2, the ports 34, 36, 38 and 40 in the buffer plate 32 and those in the valve plate 42, i.e. ports 44, 46 and 48, are out of alignment so that the valve plate 42 occludes the ports in the buffer plate 32. It is necessary for the valve plate 42 to remove from the buffer plate 32 to accommodate fluid flow through the valve 10.

FIG. 3 shows, in cross-section, a full assembly of a portion of the valve 10, the same including the valve seat 12, a stop plate 50, the valving element or valve plate 42, the buffer plate 32, a guide ring 52, an assembly bolt 54, and compression springs 56 (and 56a). The seat 12 has shallow passages 58 obtaining between the annuli 14, 16, 18 and 20 upon which the buffer plate 32 sits. Compression springs 56 (only one is shown) nested in the stop plate 50 urge the valving element or valve plate 42 toward the seat 12, and the guide ring 52 is stepped to define a shoulder 60 engaging and restrictively limiting the lift of the buffer plate 32. Accordingly, in operation, after the valving element 42 and the buffer plate 32 have been forced from the seat 12, the buffer plate manifests a sort of inertial suspension in elevation above the seat 12, to obstruct the valving element 42 during the return of the latter to the seat 12. The compression springs 56, in the stop plate, accelerate the return of the valve plate 42 toward the seat 12. Yet, the buffer plate 32 has no spring assist to accelerate its seating. As a consequence, it is still in free suspension when the accelerated valve plate 42 impacts therewith. Buffer plate 32, then, intercepts and decelerates the valve plate 42 during its return to rest.

It is well known in the prior art to employ buffer plates between the stop plate and the valving element. However, such practice does not anticipate or suggest my invention. The instant invention offers an unexpected benefit which stop plate buffering does not and can not offer. The seat buffering of my invention, neither shown in, nor suggested by the prior art, allows a markedly greater valving element lift. The greater lift provides a better performing valve in that the latter experiences less of a pressure drop thereacross. My teaching of the use of a buffer plate 32, restricted in its lift, and interpositioned between the valving element 42 and the seat 12, assures interception, in free space, of the element 42 and its deceleration before its seating. Consequently, by selection of buffer plate weight, the spring force of the valving element return springs 56, and the like, virtually any greatly improved valving element lift may be practiced.

While I have described my invention in connection with a specific embodiment thereof, it is to be clearly understood that this is done only by way of example and not as a limitation to the scope of my invention as set forth in the objects thereof and in the appended claims. For example, optionally springs 56a (only one is shown) can be set in the seat 12, as shown in FIG. 3, to urge the buffer plate 32 away therefrom. Thus the response of the buffer plate, or its damping characteristics, could be resiliently altered.

To prevent relative rotation between the valving element 42 and the buffer plate 32, and to maintain a proper orientation of the latter components therewith, the seat 12 has alignment pins projecting therefrom which penetrate pin holes provided therefor in plate 32 and element 42. None of this has been illustrated, as the practice is well known in the prior art. Too, only a plate-type valve 10 has been illustrated and described herein. However, the appended, parent claims are not limited to a plate-type valve, as the invention is equally applicable to, and capable of practice with, ring, channel, and otherwise configured and constructed valves. So also, while my novel scalloped valve plate 42 is shown in the preferred embodiment of this invention, it is to be understood that a round valve plate can be used. All such modifications and/or alterations of the depicted and described embodiment are deemed to be within the ambit of my invention and defined by the following claims.

I claim:

1. A unidirectional, fluid control valve, comprising:
   first means defining a valve seat having a seating surface, and fluid ports formed therein;
   second means, coupled to said valve seat, defining a ported, valving element stop having a planar, stop surface; and
   third means, movably disposed between said seat and said stop, (a) for engaging said seat and occluding said ports in said seat, and (b) for lift thereof from said seat to expose said ports in said seat, thereby to prohibit, and to permit, fluid flow through said ports in said seat, respectively; wherein
   said third means comprises an apertured valving element, and an apertured buffer element;
   said buffer element is interposed between said valving element and said seat; and
   apertures in said buffer element are occluded by said valving element; and further including
   means interposed between said seating surface and said stop surface for restricting lift of said buffer element.

2. A unidirectional, fluid control valve, comprising:
   first means defining a valve seat having a seating surface, and fluid ports formed therein;
   second means, coupled to said valve seat, defining a ported, valving element stop having a planar, stop surface; and
   third means, movably disposed between said seat and said stop, (a) for engaging said seat and occluding said ports in said seat, and (b) for lift thereof from said seat to expose said ports in said seat, thereby to prohibit, and to permit, fluid flow through said ports in said seat, respectively; wherein said third means comprises an apertured valving element, and an apertured buffer element;
said buffer element is interposed between said valving element and said seat; and
apertures in said buffer element are in open fluid communication with said ports in said seat; and further including
means interposed between said seating surface and said stop surface for restricting lift of said buffer element.

3. A unidirectional, fluid control valve, comprising:
first means defining a valve seat having a seating surface, and fluid ports formed therein;
second means, coupled to said valve seat, defining a ported, valving element stop having a planar, stop surface; and
third means, movably disposed between said seat and said stop, (a) for engaging said seat and occluding said ports in said seat, and (b) for lift thereof from said seat to expose said ports in said seat, thereby to prohibit, and to permit, fluid flow through said ports in said seat, respectively; wherein
said third means comprises an apertured valving element, and an apertured buffer element;
said buffer element is interposed between said valving element and said seat; and
apertures in said buffer element and ports in said stop are out of alignment; and further including
means interposed between said seating surface and said stop surface for restricting lift of said buffer element.

4. A unidirectional, fluid control valve, comprising:
first means defining a valve seat having a seating surface, and fluid ports formed therein;
second means, coupled to said valve seat, defining a ported, valving element stop having a planar, stop surface;
an apertured valving element interposed between said seat and said stop for movement thereof through a given distance, (a) in a first direction toward said stop, and (b) in a second direction toward said seat; and
third means movably disposed between said element and said seat for (a) lift thereof from said seat, and (b) interception of said valving element, intermediate said given distance, during movement of said element in said second direction; further including
means interposed between said third means and said seat urging said third means away from said seat.

5. A unidirectional, fluid control valve, comprising:
first means defining a valve seat having a seating surface, and fluid ports formed therein;
second means, coupled to said valve seat, defining a ported, valving element stop having a planar, stop surface;
an apertured valving element interposed between said seat and said stop for movement thereof through a given distance, (a) in a first direction toward said stop, and (b) in a second direction toward said seat; and
third means movably disposed between said element and said seat for (a) lift thereof from said seat, and (b) interception of said valving element, intermediate said given distance, during movement of said element in said second direction; further including
means interposed between said element and said stop urging said element in said second direction; and
means interposed between said third means and said seat urging said third means toward said stop.

6. A unidirectional, fluid control valve, comprising:
first means defining a valve seat having a seating surface, and fluid ports formed therein;
second means, coupled to said valve seat, defining a ported, valving element stop having a planar, stop surface;
an apertured valving element interposed between said seat and said stop for movement thereof through a given distance, (a) in a first direction toward said stop, and (b) in a second direction toward said seat; and
third means movably disposed between said element and said seat for (a) lift thereof from said seat, and (b) interception of said valving element, intermediate said given distance, during movement of said element in said second direction; wherein
said valve seat comprises concentric annuli, and radial arms integral with said annuli fixing the latter in concentricity; and
through a dimension taken along a plan extending normal to said seating surface, said annuli have a given depth, and said arms have a depth of less than said given depth;
said annuli and said arms terminate in a common plane, on the side of said seat which is opposite said seating surface, and said arms are recessed from said seating surface to define shallow passages thereabove between immediately adjacent annuli thereat; and
said third means comprises a plate having apertures formed therein which open onto a plurality of said passages.

7. A valve, according to claim 6, wherein:
said plate has a plurality of radially-disposed ligaments;
said ligaments overlie said radial arms of said valve seat.

8. A valve, according to claim 6, wherein:
a plurality of said apertures each open onto a pair of said fluid ports in said valve seat.

* * * * *